United States Patent [19]

Brewer et al.

[11] Patent Number: 5,455,919
[45] Date of Patent: Oct. 3, 1995

[54] INSTALLATION AND USE OF PLURAL EXPANDED MEMORY MANAGERS

[75] Inventors: James A. Brewer, Leander; Paul R. Habermehl; James M. Stafford, both of Round Rock, all of Tex.

[73] Assignee: International Business Machines Corporation, Armonk, N.Y.

[21] Appl. No.: 971,032

[22] Filed: Nov. 3, 1992

[51] Int. Cl.[6] ............................. G06F 12/00; G06F 9/46
[52] U.S. Cl. ................. 395/650; 364/245.31; 364/245.4; 364/245; 364/DIG. 1; 395/402; 395/412; 395/700; 395/375
[58] Field of Search ................................ 395/600, 425, 395/400, 575, 275, 650, 700, 725, 375

[56]  References Cited

U.S. PATENT DOCUMENTS

| | | | |
|---|---|---|---|
| 3,435,420 | 3/1969 | Wissick . | |
| 3,469,241 | 9/1969 | Barton et al. . | |
| 3,803,560 | 4/1974 | DeVoy et al. | 395/575 |
| 3,813,652 | 5/1974 | Elmer et al. | 395/400 |
| 4,001,790 | 1/1977 | Barlow | 395/325 |
| 4,025,903 | 5/1977 | Kaufman et al. | 395/425 |
| 4,037,215 | 7/1977 | Birney et al. | 395/425 |
| 4,234,934 | 11/1980 | Thorsrud | 395/400 |
| 4,254,463 | 3/1981 | Busby et al. | 395/400 |
| 4,280,176 | 7/1981 | Tan | 395/425 |
| 4,303,993 | 12/1981 | Panepinto, Jr. et al. | 365/230.03 |
| 4,354,258 | 10/1982 | Sato | 365/189.07 |
| 4,355,376 | 10/1982 | Gould | 365/200 |
| 4,414,627 | 11/1983 | Nakamura | 395/400 |
| 4,740,916 | 4/1988 | Martin | 395/425 |
| 4,926,322 | 5/1990 | Stimac et al. | 364/DIG. 1 |
| 4,943,910 | 7/1990 | Nakamura | 364/DIG. 1 |
| 4,974,159 | 11/1990 | Hargrove et al. | 395/650 |
| 5,123,098 | 6/1992 | Gunning et al. | 395/400 |
| 5,237,669 | 8/1993 | Spear et al. | 395/400 |
| 5,280,599 | 1/1994 | Arai | 395/425 |
| 5,349,661 | 9/1994 | Brewer et al. | 395/700 |

FOREIGN PATENT DOCUMENTS 0071315  7/1982  European Pat. Off. .

OTHER PUBLICATIONS

IBM TDB, "Memory Allocation and Addressing", vol. 11, No. 1, Jun. 1968, pp. 67–70.
IBM TDB, "Memory Addressing System", vol. 15, No. 3, Aug. 1972, pp. 1035–1036.

*Primary Examiner*—Thomas G. Black
*Assistant Examiner*—Hosain Alam
*Attorney, Agent, or Firm*—Mark E. McBurney; Richard A. Henkler

[57]  ABSTRACT

Simultaneous use of multiple expanded memory cards and their associated Expanded Memory Manager (EMM) device drivers in a computer system is provided. First, an expanded memory card is added and its EMM device driver will check to verify if another EMM driver is currently installed. If so, the new EMM device driver will take control of the existing EMM device driver in a master-slave relationship. The new EMM device driver (master) controls the existing EMM device driver (slave) by use of the slave's interrupt vector. That is, the master controls the slave by having an interrupt vector for the slave readdressed to be input to the master. Thereby, providing the master with the expanded memory interrupts the slave was required to service. The master also takes control of all the slave's handles and pages by appearing as a requesting program application to the slave. Another feature of the present invention will allow multiple EMM device drivers to be installed in an efficient manner, by eliminating code that is redundant between existing and newly added EMM device drivers.

10 Claims, 9 Drawing Sheets

INSTALLATION AND USE OF PLURAL EXPANDED MEMORY MANAGERS

BACKGROUND OF THE INVENTION

1. Field of the Invention

The present invention generally relates to the installation and use of plural expanded memory devices and Expanded Memory Manager (EMM) device drivers in an information handling system. More particularly, two or more EMM device drivers and respective additional memory hardware can be efficiently installed and operated concurrently such that memory can be cumulatively added, rather than replaced.

2. Description of Related Art

Typically, an Expanded Memory Manager (EMM) device driver is installed in conjunction with an additional memory card to provide additional system random access memory (RAM). When further RAM capacity is needed, conventional systems require replacement of the originally added additional memory with a new additional memory card having a capacity larger than the original. At this time the original device driver is typically replaced with a new device driver that controls the new additional memory. Generally, if a card is the same brand/type as the original, the EMM driver will support both the old and new memory cards.

For example, a typical computer system may have one megabyte of RAM on the system board and another megabyte on an adapter card, for a total of 2 megabytes. Normally, to upgrade this system the one megabyte card will be removed and a larger capacity expanded memory card installed, along with a new EMM device driver. The existing memory card is not used and its device driver is deleted, or ignored.

The majority of existing EMM device drivers do not support more than one type of card. If a user has an existing expanded memory card and purchases a new card, the existing and new cards will not work together (exceptions may be cards purchased from the same vendor). Therefore, the user is normally unable to use the old card for expanded memory purposes after installing the new card and its associated driver.

It is extremely difficult to produce an EMM device driver that will support multiple cards. The hardware specifications for vendor cards are usually not available, which precludes writing a device driver to support these cards. Also, many expanded memory cards are currently on the market, and creating a device driver to support all of them requires an enormous amount of time and resource, since the device driver code must be written to support each different card, and some mechanism must be devised to know when to call an appropriate hardware control routine. Creating a device driver to support multiple different memory cards may also negatively impact performance, since the device driver code must constantly check to determine which hardware device needs to be activated or deactivated. Further, from an economic stand point, it may be a poor use of resources to create software to support older hardware devices, just because they are on the market, when newer memory cards are presently being developed or sold.

A small number of computer component suppliers do have device drivers that will support more than a single expanded memory card. However, in these cases the EMM device drivers only support the expanded memory cards provided by that particular supplier. Furthermore, even EMM device drivers that are capable of supporting more than one card are unable to provide concurrent support to multiple cards.

U.S. Pat. Nos. 4,254,463; 4,037,215; and 4,414,627 all translate or convert addresses to provide memory mapping. U.S. Pat. No. 4,001,790 includes control units connected by a common bus that enable transfer information, including data and addresses to and from these units. U.S. Pat. No. 3,469,241 provides communication within a data processing system to transfer data from data storage units to the processing system. Symbolic addresses are translated into signal which represent actual addresses of a block of memory. U.S. Pat. No. 4,025,903 includes a bank of memory that appear to a CPU as a single large memory. Memory modules call be replaced with larger modules so long as the total memory remains below the maximum allowable memory. Calculators are included on the memory modules and interlocked so that address boundaries are calculated upon power up of the system. None of these references include any expanded memory control that is utilized by a subsequently installed memory controller to provide increased memory capacity by adding capacity of existing units.

Therefore, it can be seen that a need exists for a generic device driver that can concurrently control more than one expanded memory device and work in conjunction with the existing EMM drivers to allow existing memory to be added. Further, in addition to the system board, multiple memory expansion cards can be added to a computer system in the card adapter slots. Thus, a virtually unlimited amount of memory, that must be mapped into the one megabyte range recognizable by the disk operating system (DOS), can be added to a computer system.

SUMMARY OF THE INVENTION

In contrast to the prior art, the present invention provides for simultaneous use of multiple expanded memory cards and device drivers. The present invention does not require that the multiple cards be identical, but supports the multiple concurrent use of different types of expanded memory cards and EMM device drivers.

Broadly, the original memory card will be added and its device driver will install normally. However, the device driver of the present invention, when installed, will first check to verify if another EMM driver is currently installed. If so, the new device driver will take control of the original device driver in a master-slave relationship. The new device driver (master) controls the original driver (slave) by use of the slave's interrupt vector. That is, the master controls the slave by having an interrupt vector for the original device driver readdressed to be input to the new device driver. Thus, the new driver knows what expanded memory interrupts the original driver needs to service. The new driver also takes control of all the original driver's handles (an address or name given out to an application so that it can request pages of memory) and pages (addressable memory locations) by acting like a requesting program application to the existing driver. In this manner, the newly installed device driver can control and utilize the resources of the existing driver and allow concurrent use of the new and existing memory capacity. The present invention makes it possible to continually add expanded memory and have this memory work in conjunction with the existing expanded memory. Multiple expanded memory cards and device drivers can be added to a system wherein the last installed device driver will be the master and the existing device drivers will be chained slaves. That is, the present invention is not limited to a single existing memory device and driver, used with a new memory card/driver combination, but is applicable to substantially any number of expanded memories and device drivers that can be physically installed in a computer system.

The services provided by the master driver will be the minimum common services provided by both drivers. For instance, if the master driver supports 64 alternate register sets and the slave supports 16, the total number of register sets supported will be 16. The hardware register sets are used by program applications to map memory addresses to physical locations in memory. The least common number of supported register sets must be utilized to ensure consistency between the installed hardware memory cards.

Another feature of the present invention will allow multiple device drivers to be installed in an efficient manner, using only a minimum of the executable of code from the multiple device drivers. That is, in a chained relationship the master driver will take over use of certain functions and data storage space that are not needed by the slave driver. It can be seen that when the original driver was the only EMM device driver present in the system, its entire executable code was required. However, when the new driver (master) installs, it will take over most of the function of the original driver (slave), thereby allowing the redundant executable code in the slave device driver to be eliminated. Only a portion of the executable code and data storage space for the slave device driver will be needed by the master, e.g. control of the basic operations, hardware functions, driver support, Lotus-Intel-Microsoft (LIM) support, mapping table support and the like. Eliminating the redundant executable code allows for a smaller slave device driver to be utilized which will use less memory. This is an important feature since the whole point of expanded memory is to gain as much additional memory as possible.

Therefore, in accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 1:
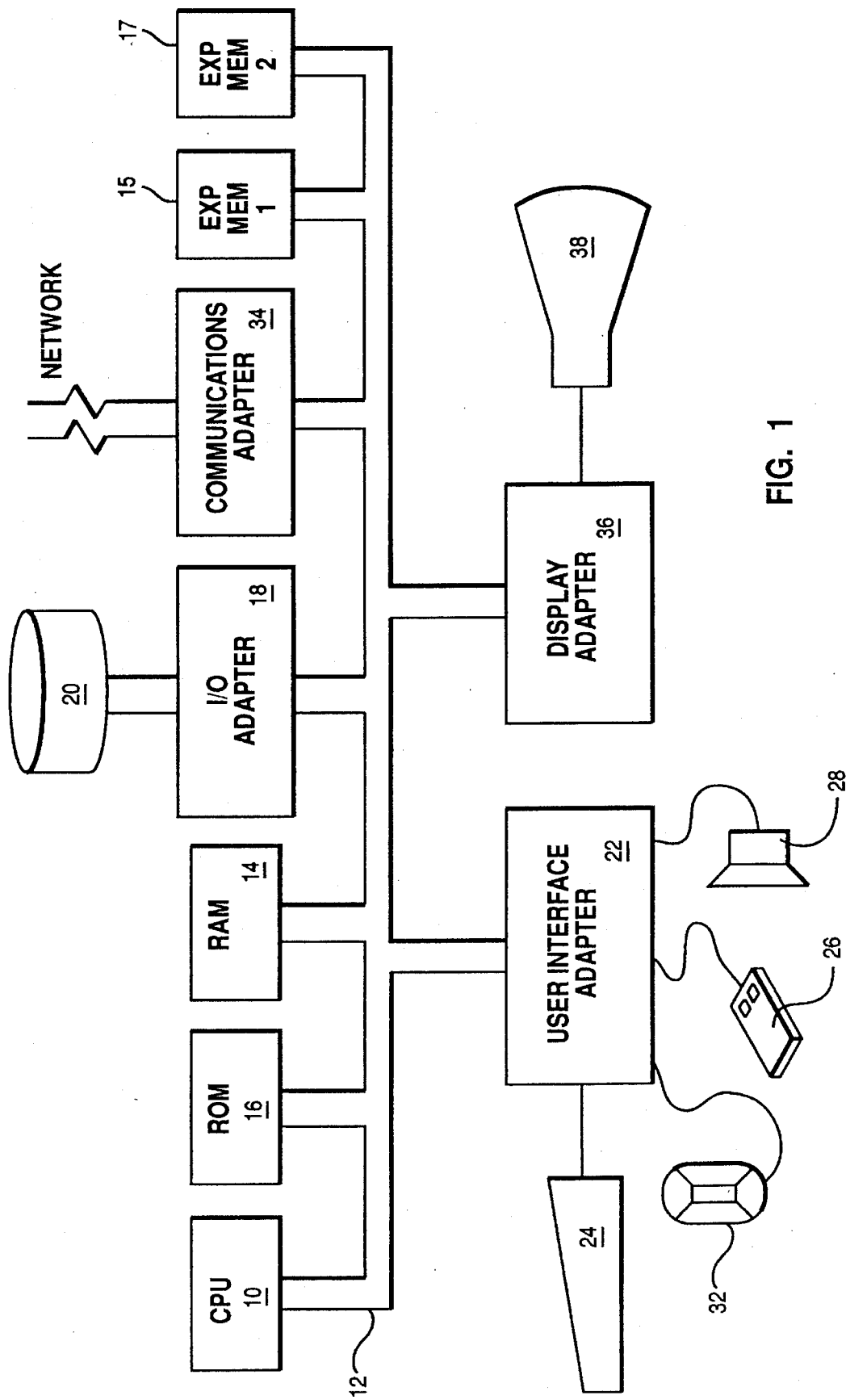
FIG. 1 is a schematic diagram representing hardware components of a typical data processing system.

Referring to FIG. 1, a typical data processing system is shown which may be used in conjunction with the present invention. A central processing unit (CPU), such as one of the Intel X86 processors is provided and interconnected to the various other components by system bus 12. Read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. Expanded memory 15 and 17 is additional RAM added to the data processing system and is also shown interconnected to bus 12. Expanded memories 15 and 17 (controlled by EMM device driver 56, 58 respectively, FIG. 2) are generally circuit cards that include multiple single in line memory modules (SIMMs) along with corresponding registers capable of being written to by the EMM device driver. As noted above, the number of registers capable of being used will be determined by the least common number of registers supported by the corresponding device drivers. It should be noted that program applications rarely require more than 3 or 4 register sets and limiting the present invention to the least common number, will not normally cause any inefficiencies during system operation. I/O adapter 18 may be a Small Computer System Interface (SCSI) adapter that communicates with a disk storage device 20. Communications adapter 34 interconnects bus 12 with an outside network enabling the data processing system to communicate with other such systems. Input/Output devices are also connected to system bus 12 via user interface adapter 22 and display adapter 36. Keyboard 24, track ball 32, mouse 26 and speaker 28 are all interconnected to bus 12 via user interface adapter 22. Display monitor 38 is connected to system bus 12 by display adapter 36. In this manner, a user is capable of inputting to the system through the keyboard 24, track ball 32 or mouse 26 and receiving output from the system via speaker 28 and display 38. Additionally, an operating system such as DOS or the OS/2 system (OS/2 is a Trademark of IBM Corporation) is used to coordinate the functions of the various components shown in FIG. 1.

Figure 2:
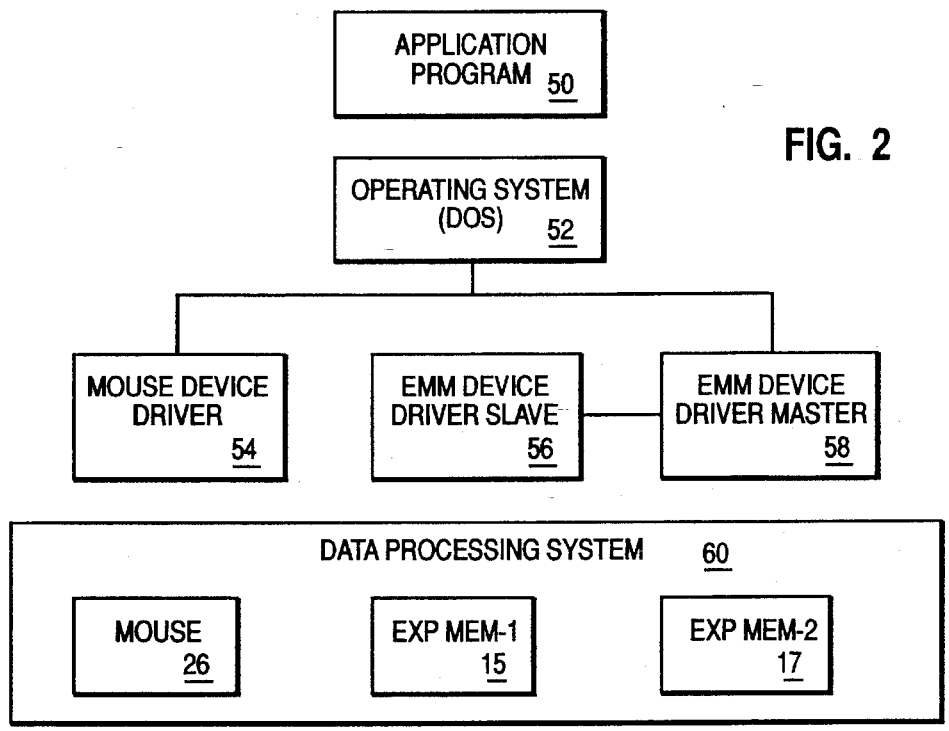
FIG. 2 is a block diagram of the hardware and software components of the present invention.

FIG. 2 is a block diagram illustrating the interrelationship between the hardware and software components of the present invention. An application program 50 runs in conjunction with the DOS operating system 52 which includes various device drivers, examples of which are mouse driver 54 and EMM device drivers 56, 58. Generally, the first expanded memory and associated device driver (e.g. memory 15 and EMM device driver 56) are installed by being placed in an installation line in a CONFIG.SYS file stored in memory 14. The user may access the operating system 52 directly or through application 50 depending on the particular functions to be implemented. It should be noted that the installation line will remain constant each time the system is booted, unless the installation line is altered by a setup program or the user, which will occur when an additional expanded memory and associated device driver (e.g. memory 17 and driver 58) are added to the system configuration. The present invention allows for the installation and operation of multiple subsequent memory cards and device drivers in a single computer system. After reconfiguration of the installation command line it will be placed in the CONFIG.SYS file used by the DOS operating system. Thus, upon initialization of the system, i.e. turning the power on, the multiple device drivers are installed without further user interaction. It is only when a different configuration, such as the addition of yet another memory card and device driver, is desired that a user will access the installation line of the CONFIG.SYS file to make changes.

Figure 3:
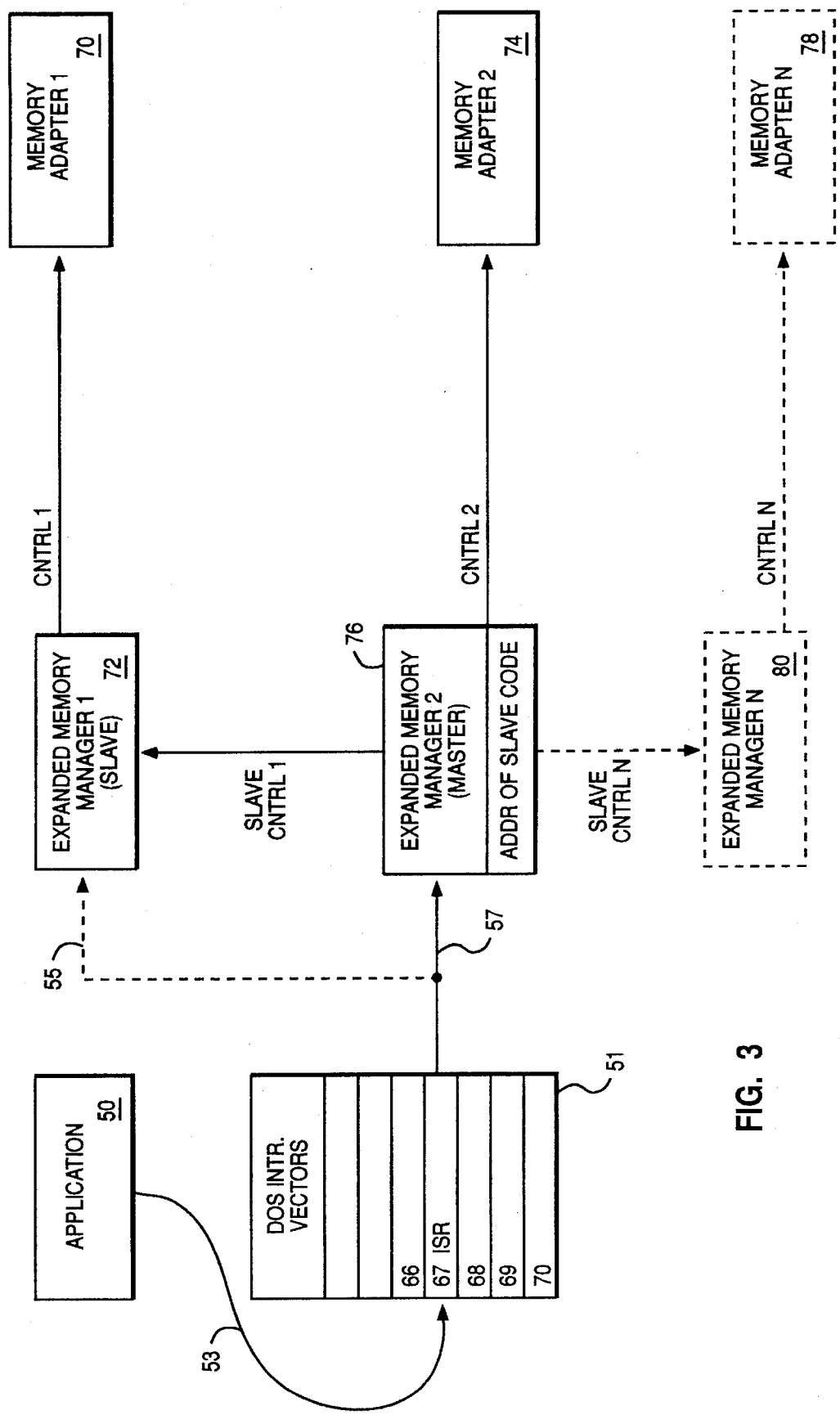
FIG. 3 is a schematic diagram showing the chained master/slave relationship of the existing and newly added EMM device drivers.
Figure 4:
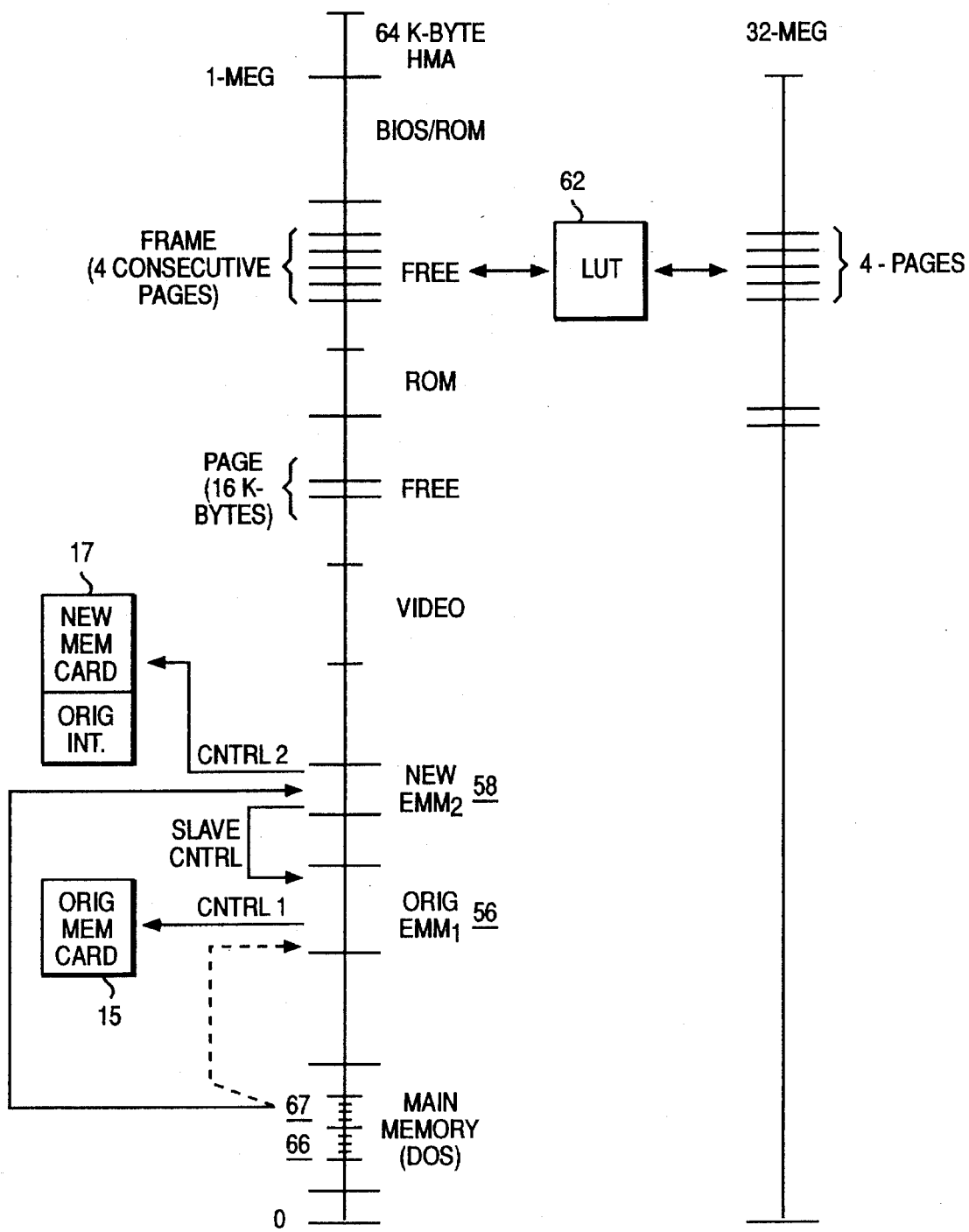
FIG. 4 is a system memory map showing the device drivers stored in memory and the respective vectors.

Referring to FIG. 3 a block diagram shows how the plural memory cards and corresponding device drivers are configured in accordance with the present invention. An original hardware memory adapter card 70 is installed along with its corresponding EMM device driver 72. It can be seen that subsequent to the installation of an additional memory card 74 and device driver 76 of the present invention, the original EMM driver 72 becomes the slave, with the newly installed driver 76 as the master. Additionally, application 50 is shown which issues a software interrupt which uses a vector 53 to access an address in a DOS interrupt vector table 51. Original EMM 72 places the address of the interrupt service routine (ISR) at location 67 hex, which is in table 51 stored in DOS main memory (FIG. 4). Application 50 calls the ISR through the vector stored at 67 hex, via Interrupt vector 53. Before the addition of the new EMM 76, the original EMM 72 accessed the interrupt service routine through vector 55. The ISR may handle any number of tasks, such as reading/writing data to memory adapter 70. However, with the present invention, the new EMM driver 76 will read the address of the ISR from original EMM 72 and save the address. Additionally, EMM 76 will write over the old EMM 72 address stored in table 51 and replace it with the location of where the ISR for EMM 76 begins. In this manner, when application 50 calls for a software interrupt, e.g. to transfer data between expanded memories 70, 74, the interrupt service routine in 67 hex will now point to new EMM 76. That is, the interrupt vector 57 will now point to EMM 76.

Master driver 76 uses commands CNTRL2 to control its corresponding memory card 74. In order to control slave device driver 72, the master driver 74 utilizes a SLAVE CNTRL1 signal that looks like a command from a program application to driver 72 (EMM 76 actually gives commands to driver as though it were an application). Thus, driver 72 will issue control signals for memory adapter card 70 by using a control signal CNTRL1, based on the commands received from master driver 76 (SLAVE CNTRL1). In this manner, device driver 76 of the present invention is capable of controlling the existing device driver 72 and ultimately controls the operations of both memory cards 70 and 74.

It should be noted that a plurality of memory card/device driver combinations can be operated concurrently in accordance with the present invention. For example, if memory card 78 were the nth card installed in the system, then the interrupt request vectors for the next previous memory cards would be readdressed for receipt by the newest installed device driver 80. All of the previously installed device drivers will be chained together by the SLAVE CNTRL signals, such that the newest driver 80 will only have to issue a SLAVE CNTRL signal to the next previously installed device driver, in order to control the mapping functions of all expanded memory cards FIG. 4 is a map of the physical memory locations in a typical computer using the DOS operating system. DOS is capable of addressing a one megabyte portion of memory. It can be seen that the addressable one megabyte of memory is allocated between various functions within the computer system. A first portion is allocated for storing and use of the DOS operating system (e.g. table 51) with an additional portion being held free for subsequent memory requirements. The video memory requirements of the computer system are then accounted for, which includes memory needed to display images on display 38 such as required by a frame buffer, bit map, character generator, or the like. Another free portion is reserved for use in subsequent processing and ROM 16 has also been allocated a portion of system memory. Another free portion is then designated and the BIOS stored in ROM 16 (FIG. 1) is designated as the final portion of the addressable one megabyte memory in a DOS system. Since DOS can only address memory within this one megabyte range, when additional memory is added by expanded memories 15, 17 (FIG. 1), a controller is required to map the expanded memory into and out of the one megabyte range. Generally, hardware expanded memory cards are provided for the computer system such that the memory in excess of one megabyte can be transferred into the one megabyte addressable range and addressed allowing information to be stored therein. The expanded memory can be up to 32 megabytes, as defined in the industry EMM specifications, and is mapped into the one megabyte DOS memory as single pages (16 K-bytes), or as four consecutive pages which transfers into the DOS memory as a 64 K-byte frame. Information is stored in these pages which is then mapped back into the expanded memory and can be used when recalled by a subsequent mapping operation. One of the memory units for mapping the segments of memory is a page which is defined as a 16 K-byte block of EMM usable memory and may be interspersed throughout the memory, as shown in FIG. 4. A frame is another unit of memory location and is defined as four consecutive pages which is effectively a 64 K-byte segment of memory. The EMM device driver is required in order to correlate the mapping of pages of memory between the one megabyte memory that is addressable by DOS and the expanded memory 15 and 17 (FIG. 1).

The EMM device drivers 56, 58 (FIG. 2) perform this mapping function by writing to a set of mapping registers included on expanded memories 15, 17 to load an additional address for each register's corresponding discrete amount of memory in a look up table (LUT) 62, as shown in FIG. 4, such that memory segments of the expanded memories, 15, 17 can be accessed either directly by writing to the actual physical expanded memory address, or by writing to the additional address corresponding to a mapped address within the one megabyte memory range accessible by DOS. In this manner, the additional memory capacity of expanded memories 15, 17 is mapped into and out of the one megabyte DOS addressable memory, thereby effectively enabling DOS to access more than one megabyte of RAM. Further, the EMM device drivers 56, 58 will write to the aforementioned registers on expanded memory 15 or 17 upon receiving an application interrupt request. That is, once the EMM device drivers 56, 58 (FIG. 2) are installed, they then begin memory mapping functions upon receipt of a software interrupt from application 50 (FIG. 3).

It can be seen from FIG. 4 how the original EMM device driver 56 is installed in the one megabyte portion of memory and corresponds to memory card 15. New device driver 58 has also been installed in the one megabyte memory above driver 56 and corresponds to memory card 17. The software interrupt request vector from card 15 has been saved and readdressed for receipt by EMM driver 58. Further, driver 58 controls driver 56 through the commands SLAVE CNTRL1, which makes driver 58 look like a program application to EMM device driver 56. In this manner, the existing 56 driver is now called directly by the newly added EMM device driver 58. As previously described with reference to FIG. 3, the newly installed device driver 58 is capable of controlling the mapping functions of both memory cards 15 and 17 by receiving the interrupt request vectors as shown in FIGS. 3 and 4. More particularly, the interrupt goes to the software control routine which then controls expanded memory card 17 directly (CNTRL2), or card 15 through EMM 56 (SLAVE CNTRL1 and CNTRL1).

Figure 5A:
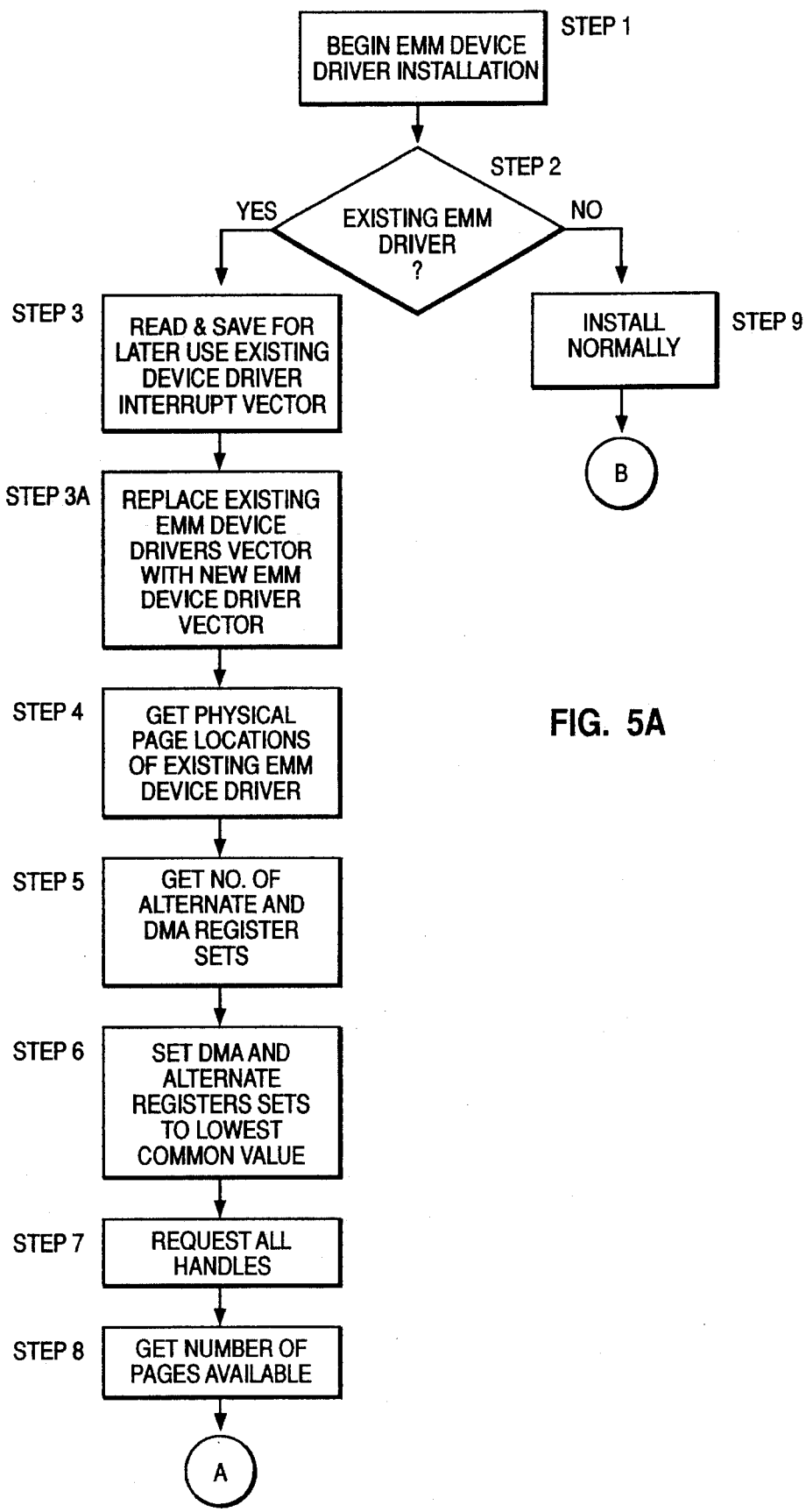
FIG. 5A and 5B are flowcharts showing the EMM device driver installation process.
Figure 5B:
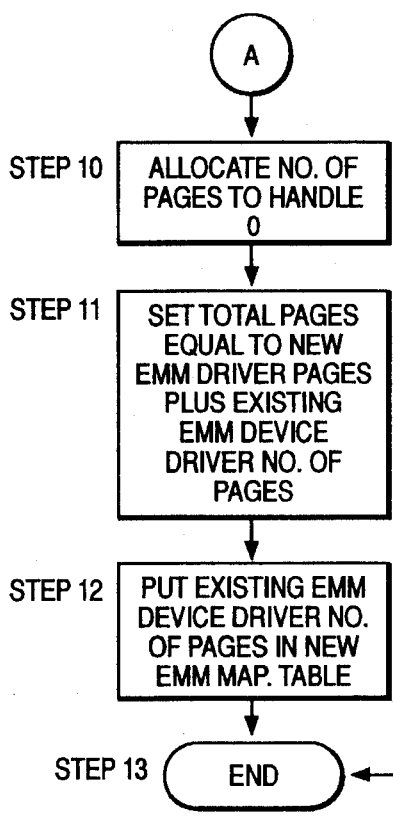

FIGS. 5A and 5B are flowcharts that illustrate the process required to install a device driver according to the present invention. At step 1, the EMM device driver installation process is begun. It is determined, at step 2, if an existing EMM device driver is present in the system. If not, the method proceeds to step 9 where the EMM is installed normally and the installation process ends at step 13. However, if another EMM driver is present, then the process continues to step 3 wherein the current interrupt vector is read and saved since it contains the address of the original EMM device driver code. Step 3a replaces interrupt vector (reference 55 of FIG. 3) of the existing EMM driver 72 with a new EMM device driver vector (reference 57 of FIG. 3), that is addressed to the newly installed driver 76. Next, at step 4, the physical page locations for the existing EMM driver are obtained, i.e. the memory location(s) where the existing driver is located. The number of alternate and direct memory access (DMA) register sets supported by the existing driver is then obtained (step 5). As previously noted, the register sets that are supported by the concurrent device drivers will be the least common denominator of the register sets supported by the existing and new device drivers. At step 6, the DMA and alternate registers are set to their lowest common values. The master driver, at step 7, then requests all handles (an 8 bit value which is assigned to each requesting application so that they may be identified, i.e. names for the application that requests the memory location) from the original device driver (up to 256). At step 8 the master driver gets the number of pages in memory available for mapping from the slave device driver. The newly installed device driver then allocates all of the pages from the existing driver to handle 0 (step 10). The new driver uses handle 0 when dealing with the existing device driver in order to look like a program application to the existing driver. Step 11 then sets the total number of allocatable pages equal to the pages supported by the new EMM device driver and the pages from the existing driver (assigned to handle 0). In this manner, the pages available from the existing memory card and the additional memory card are added, giving more expanded memory than would be possible if the existing memory were merely replaced by the new memory. The existing EMM device driver pages may then be placed into a mapping table (under control of the original EMM 56) such that they can be mapped, via the hardware LUT 62 into the one megabyte DOS memory under the control of the newly added EMM device driver (step 12). The method of installing at least one additional device driver then ends at step 13.

Figure 6A:
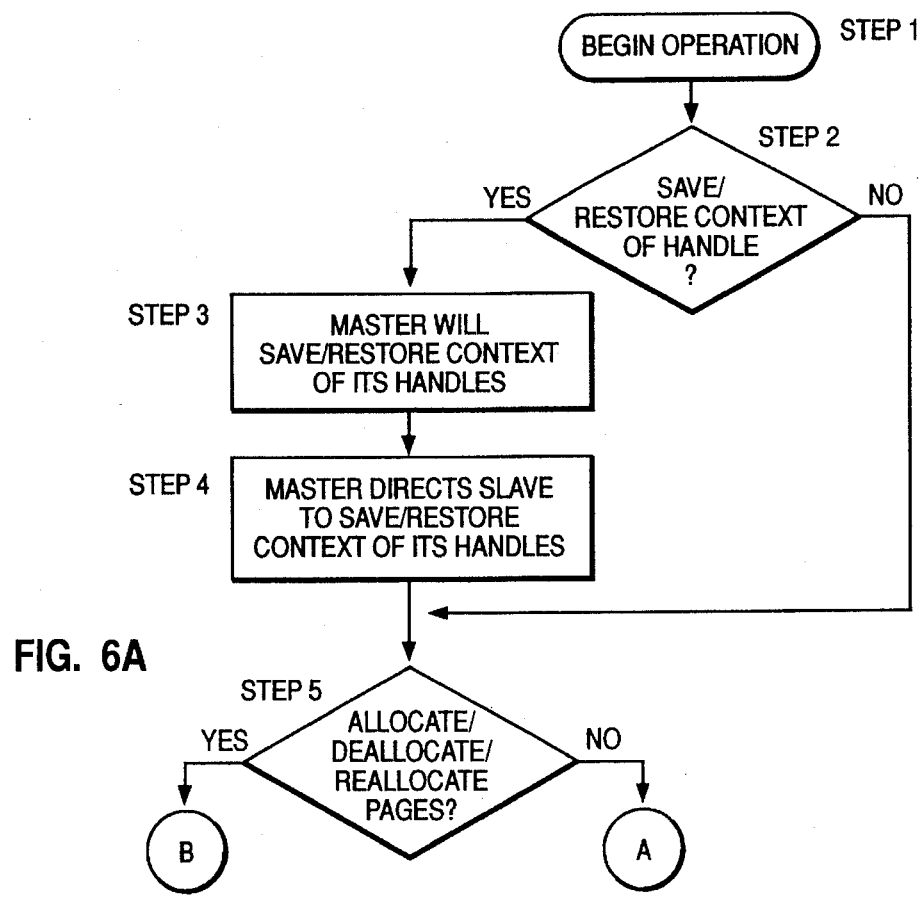
FIG. 6A and 6B are flowcharts of the operation of plural EMM device drivers in a single system in accordance with the present invention.
Figure 6B:
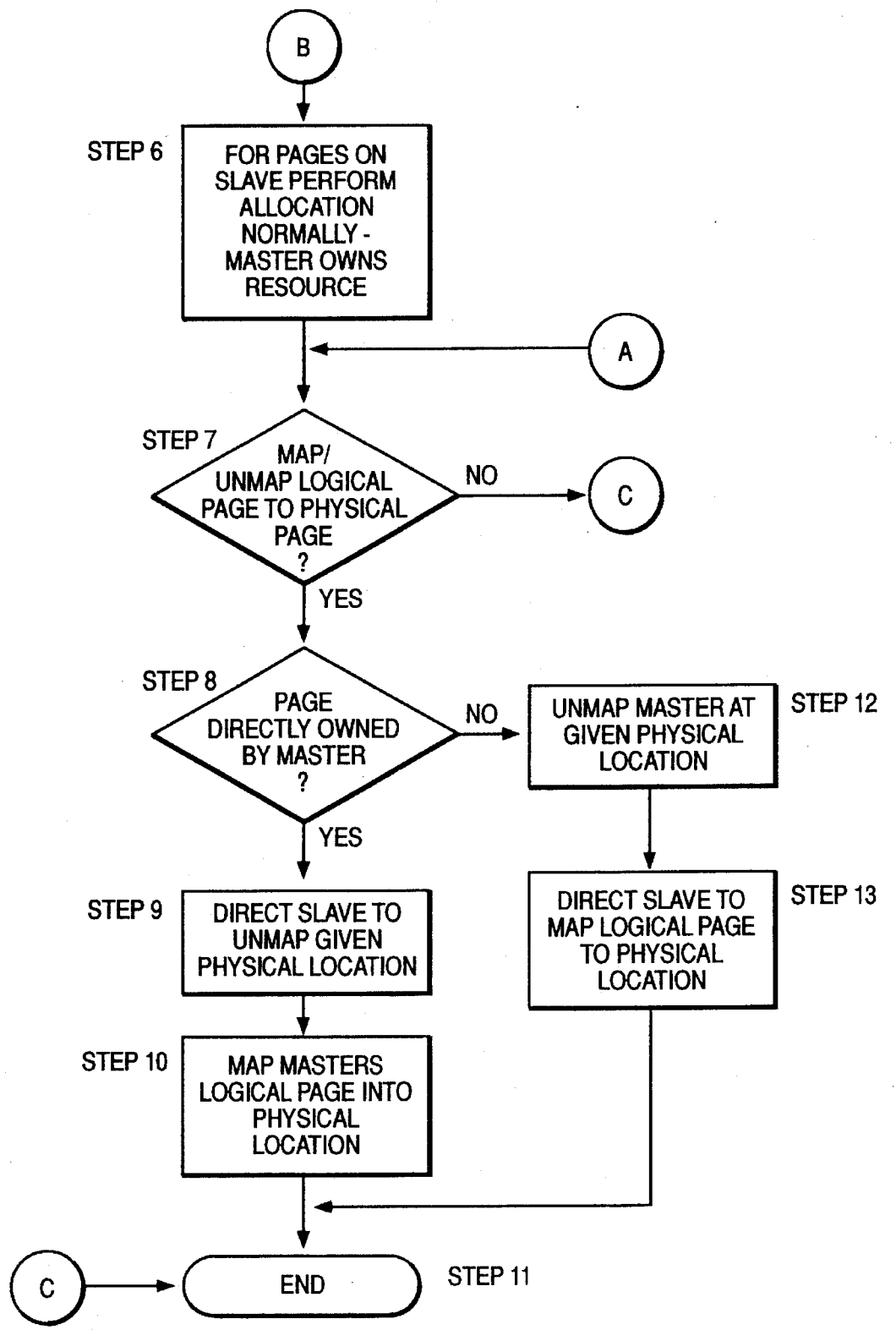

FIGS. 6A and 6B are flowcharts describing the operation of the existing and newly added EMM device drivers in accordance with the present invention. At step 1 the operation begins, and step 2 determines if the context of a given handle is to be saved or restored. The master driver will save or restore the context of the handles that it supports (step 3) and direct the slave device driver by issuing EMM commands to the slave (commands that look like a command from an application) to save or restore the context of the handles that it supports (step 4). Step 5 then determines if any pages in memory are to be allocated, deallocated, or reallocated. If so, for pages that are on the existing memory device, the memory allocation is performed normally, since the master device driver essentially owns the slave driver (viewed as a Resource of the master). If no pages are to be allocated, deallocated or reallocated at step 5, and subsequent to step 6, the process continues to step 7 where it is determined if any logical pages are to be mapped or unmapped to physical memory locations, i.e. are pages of memory physically located on the memory cards to be mapped into, or out of, the one megabyte DOS memory portion. If not, the method continues to step 11 and ends. However, if at step 7, memory pages are to be mapped, then step 8 determines if the pages are owned by the newly added device driver (master). If the pages are owned by the master, then at step 9, the slave is directed to unmap the given physical location on the original expanded memory card. At step 10, the master is then directed to map the page at the given physical location. If, at step 8, it is determined that the master does not own the page, then it must be owned by the slave and the master must unmap the given physical page location at step 12. The slave device driver is then directed to map the logical page location to the physical memory location on the existing expanded memory card. Subsequent to steps 10 and 13, wherein logical pages owned by either the master or slave device drivers have been mapped to the respective expanded memory cards, the process ends at step 11.

Figure 7:
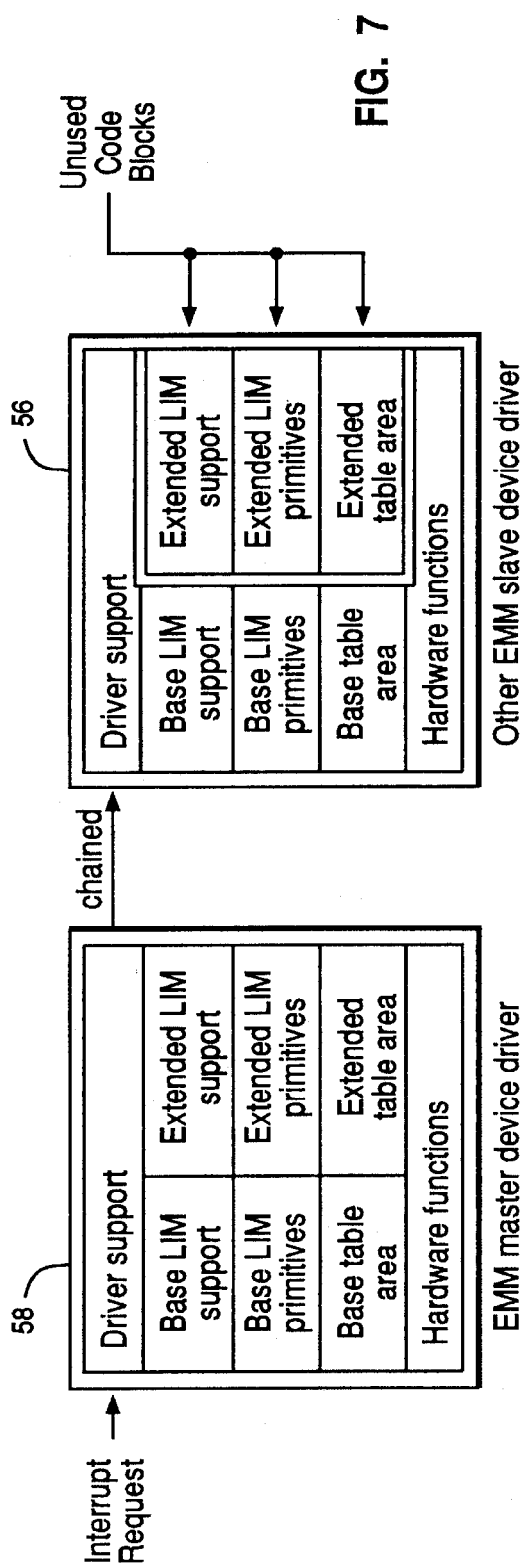
FIG. 7 shows the redundant function contained within an existing (slave) device driver and a new (master) device driver.
Figure 8:
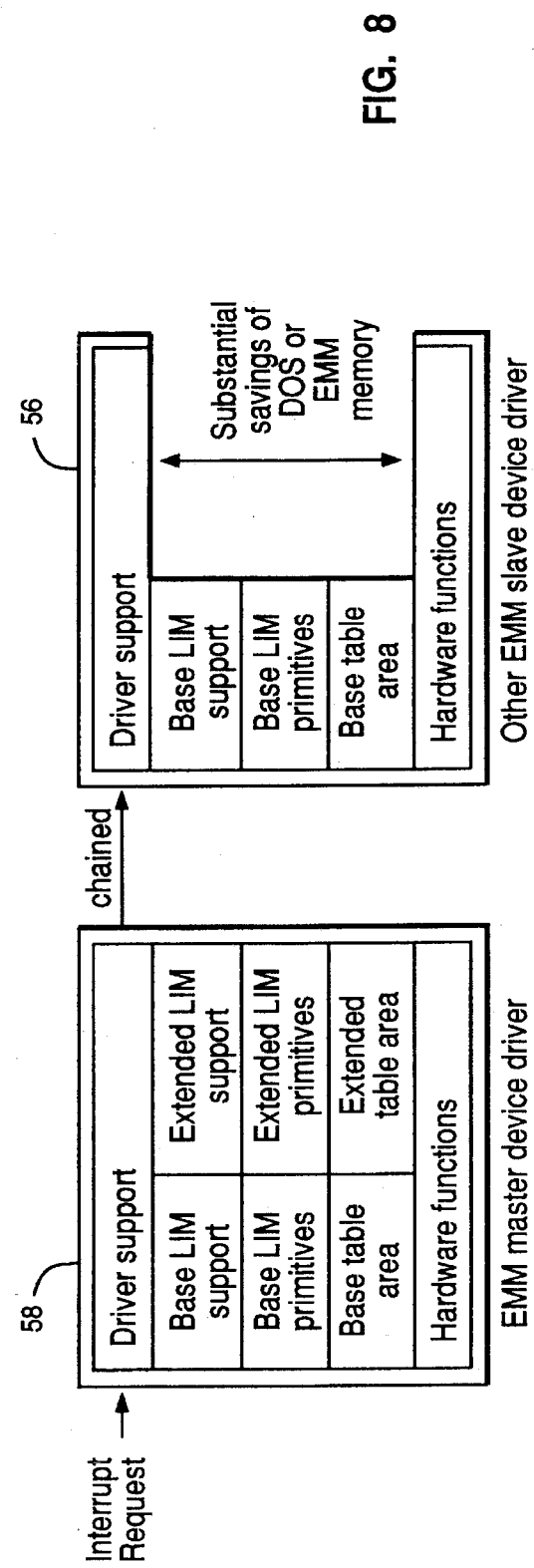
FIG. 8 shows the savings in memory when the duplicated code that is common to the existing and new device drivers is eliminated.

FIG. 7 and 8 are used to illustrate an additional feature of the present invention. Not only can memory be cumulatively added by using plural expanded memory cards in accordance with the present invention, but additional memory can be saved by eliminating redundant functions between the existing and new EMM device drivers. For example, FIG. 7 shows the code required for an EMM device driver as contemplated by the present invention. Existing driver 56 (slave) includes driver support code, hardware functions base LIM support and primitives, base table area, extended LIM support and primitive and extended table area. It can be seen that the newly added device driver 58 (master) includes the same code as the slave device driver. Since, the two device drivers are chained together in a master/slave relationship, it can be seen that redundant code exists which can be eliminated, thereby making additional memory space available.

FIG. 8 shows the functions that can be eliminated due to the chained relationship of the device drivers. The master driver 58 will need to maintain the driver support and hardware functions of the EMM slave device driver, as well as the base LIM support and primitives and base table area. However, the extended LIM support and primitives, and extended table area is now supported by the master EMM driver, allowing the code from the existing device driver to be eliminated (written over) during installation of the new device driver. Not only is more memory made available for other uses, but processing speed is increased due to a more streamlined slave device driver. In any event, the underlying reason for adding expanded memory is to gain memory capacity and by eliminating redundant EMM device driver code, more memory is made available for use by the system.

Figure 9:
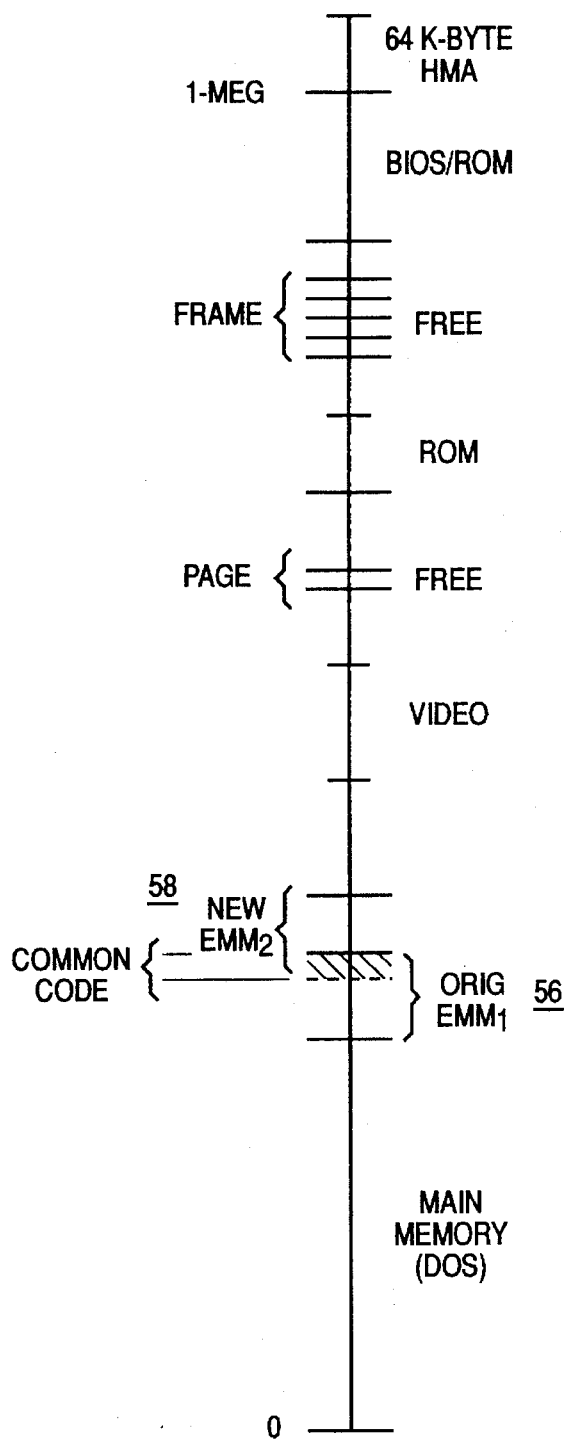
FIG. 9 illustrates on a system memory map the memory savings when redundant code is removed.
Figure 9:
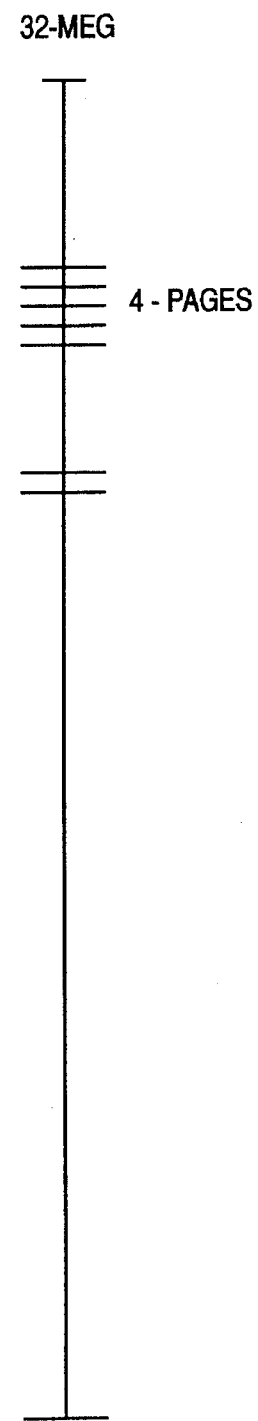

FIG. 9 is a system memory map that graphically illustrates the advantage in using only one set of code for the functions required by the master and slave device drivers. It can be seen that, in accordance with the present invention, after installation and elimination of redundant unneeded code, new EMM driver 58 and existing driver 56 will occupy a portion of memory that is less than would have been required for the two individual device drivers, if the common code had not been eliminated. The portion of memory labelled as common code represents the savings in memory space that can be realized by using this feature of the present invention. The amount of memory that can be made available by eliminating common code is on the order of 4 K-bytes to 32 K-bytes, depending on the EMM device drivers being installed, and how they are being implemented in the system. It should be noted that EMM device drivers must be designed such that replacement of redundant code can occur. That is, redundant code must be isolated and start/stop positions must be clearly identified so that a master can reuse (write over) that portion of memory.

Figure 10:
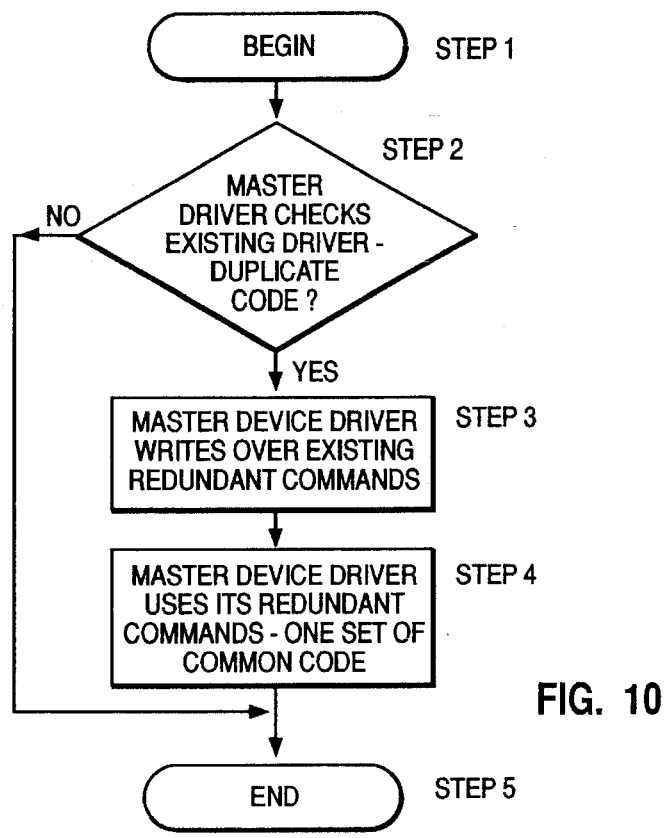
FIG. 10 is a flowchart of the process used to determine what code is redundant between the existing and new drivers, and how the new driver is capable of writing over the duplicated code contained in the original device driver.

FIG. 10 is a flowchart illustrating the method by which redundant code, contained within the slave device driver, is written over by the master EMM device driver. At step 1 the method begins and step 2 determines if duplicate code exists between the master and slave device drivers. If no redundant code exists, then the method proceeds to step 5 and ends. However, if duplicate function does exist, then at step 3 the master device driver writes over the existing redundant commands in the slave device driver with its own commands for the redundant function. At step 4 the master device driver then uses this set of commands for the redundant function as the common code (FIG. 9) for the master and slave EMM device drivers. After step 4, the process continues to step 5 and ends.

Although certain preferred embodiments have been shown and described, it should be understood that many changes and modifications can be made therein without departing from the scope of the appended claims.

What is claimed is:

1. A method of expanding available memory in a data processing system executing a Disk Operating System (DOS), said data processing system having a first expanded memory device and a first device driver for controlling mapping functions of said first expanded memory device within said DOS, said method comprising the steps of:

installing a second expanded memory device and a second device driver for controlling mapping functions of said second expanded memory device and said first expanded memory device within said DOS;

assigning the mapping functions of said first device driver to said second device driver; and transmitting commands from said second device driver to said first device driver upon the receipt of a request for information stored within said first expanded memory device.

2. A method according to claim 1 wherein said step of assigning comprises the steps of: saving the physical address of said first device driver; and rerouting a application interrupt associated with said first device driver to said second device driver.

3. A method according to claim 2 wherein said step of assigning further comprises the steps of:

determining an amount of usable memory associated with said first expanded memory device; and allocating said usable memory from said first expanded memory device to said second expanded memory device driver.

4. A method according to claim 3 wherein said step of assigning comprises the step of:

mapping logical memory locations owned by said first and second expanded memory devices to physical memory locations.

5. A method according to claim 4 further comprising the steps of:

determining whether redundant commands exist within said first device driver and said second device driver; and writing over said determined redundant commands within said first device driver with similar commands within said second device driver, thereby eliminating said determined redundant commands within said first device driver.

6. A system for expanding available memory in a data processing system executing a Disk Operating System/ DOS/, said data processing system having a first expanded memory device and a first device driver for controlling mapping functions of said first expanded memory device, said system comprising:

a second expanded memory device and second device driver for controlling mapping functions of said second expanded memory device and said first expanded memory device within said DOS;

means for assigning the mapping functions of said first device driver to said second device driver;

means for transmitting commands from said second device driver to said first device driver upon the receipt of a request for information stored within said first expanded memory device.

7. A system according to claim 6 wherein said means for assigning comprises:

means for saving the physical address of said first device driver; and means for rerouting an application interrupt associated with said first device driver to said second device driver.

8. A system according to claim 7 further comprising:

means for determining an amount of usable memory associated with said first expanded memory device; and means for allocating said usable memory from said first expanded memory device to said second expanded memory device driver.

9. A system according to claim 8 further comprising:

means for mapping logical memory locations owned by said first and second expanded memory devices to physical memory locations.

10. A system according to claim 9 further comprising:

means for determining whether redundant commands exist within said first device driver and said second device driver; and means for writing over said determined redundant commands within said first device driver with similar commands within said second device driver, thereby eliminating said determined redundant commands within said first device driver.

* * * * *

UNITED STATES PATENT AND TRADEMARK OFFICE
CERTIFICATE OF CORRECTION

PATENT NO. : 5,455,919
DATED : October 3, 1995
INVENTOR(S) : James A. Brewer, Paul R. Habermehl and James M. Stafford It is certified that error appears in the above-indentified patent and that said Letters Patent is hereby corrected as shown below:

Col. 9, line 54, delete "a" and insert --an--;
Col. 10, lines 18-19, delete "System/DOS/" and insert --System (DOS)--; and
line 24, after "and" insert --a--.

Signed and Sealed this

Twenty-fifth Day of June, 1996

Attest:

BRUCE LEHMAN

*Attesting Officer*  *Commissioner of Patents and Trademarks*